(12) United States Patent
O'Toole et al.

(10) Patent No.: US 10,088,676 B2
(45) Date of Patent: Oct. 2, 2018

(54) ENHANCED SAFETY THROUGH AUGMENTED REALITY AND SHARED DATA

(71) Applicant: PAYPAL, INC., San Jose, CA (US)

(72) Inventors: Christopher Diebold O'Toole, Cedar Park, TX (US); Bryant Genepang Luk, Round Rock, TX (US); Ananya Das, Austin, TX (US); Jason Ziaja, Cedar Park, TX (US); Shaun Warman, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/198,861

(22) Filed: Jun. 30, 2016

(65) Prior Publication Data

US 2018/0003965 A1    Jan. 4, 2018

(51) Int. Cl.
| | | |
|---|---|---|
| G02B 27/01 | (2006.01) | |
| G08G 1/052 | (2006.01) | |
| G06T 19/00 | (2011.01) | |
| G08B 1/08 | (2006.01) | |
| G08G 1/08 | (2006.01) | |
| G08G 1/16 | (2006.01) | |

(52) U.S. Cl.
CPC ........ *G02B 27/0101* (2013.01); *G06T 19/006* (2013.01); *G08G 1/052* (2013.01); *G08G 1/08* (2013.01); *G08G 1/163* (2013.01); *G08G 1/164* (2013.01); *G08G 1/166* (2013.01); *G02B 2027/0138* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10

See application file for complete search history.

(56) References Cited

U.S. PATENT DOCUMENTS 5,521,633 A * 5/1996 Nakajima ............... B60Q 9/008
                                                        348/118
5,892,461 A * 4/1999 Dokko ..................... G08G 1/01
                                                        340/815.41

(Continued)

*Primary Examiner* — Todd Buttram
(74) *Attorney, Agent, or Firm* — Haynes and Boone, LLP (57) ABSTRACT

Systems and methods for enhancing traffic safety through augmented reality and shared data are disclosed. An example method includes, identifying a second transportation vehicle that at least partially blocks a first view of a first user associated with a first transportation vehicle; and obtaining second view data from the second transportation vehicle. The second view data is descriptive of a second view of a second user associated with the second transportation vehicle, and the second view includes an additional view that was blocked in the first view by the second transportation vehicle. In some implementations, the method includes presenting the second view on a first display associated with the first transportation vehicle. In other implementations, for example where the first transportation vehicle is a driver-less vehicle, the method includes providing an electronic signal identifying the second view to the first transportation vehicle.

20 Claims, 7 Drawing Sheets

(56) References Cited

U.S. PATENT DOCUMENTS

| | | | | |
|---|---|---|---|---|
| 6,100,819 A | * | 8/2000 | White | G08G 1/07 340/902 |
| 8,493,198 B1 | * | 7/2013 | Vasquez | B60Q 9/008 340/425.5 |
| 9,292,743 B1 | * | 3/2016 | Maali | G06K 9/00771 |
| 2007/0223702 A1 | | 9/2007 | Tengler et al. | |
| 2008/0055056 A1 | * | 3/2008 | Mase | G08G 1/164 340/425.5 |
| 2009/0231431 A1 | | 9/2009 | Grigsby et al. | |
| 2009/0231432 A1 | | 9/2009 | Grigsby et al. | |
| 2011/0153116 A1 | * | 6/2011 | Bedingfield, Sr. | B60K 31/0058 701/1 |
| 2012/0121132 A1 | * | 5/2012 | Asahara | G06K 9/00201 382/103 |
| 2014/0063196 A1 | * | 3/2014 | Daniel | G08G 1/04 348/46 |
| 2015/0145995 A1 | * | 5/2015 | Shahraray | B60R 1/00 348/148 |

\* cited by examiner

ENHANCED SAFETY THROUGH AUGMENTED REALITY AND SHARED DATA

TECHNICAL FIELD

The present disclosure relates generally to enhancing traffic safety, and in particular, to enhancing traffic safety through augmented reality and shared data.

BACKGROUND

Various safety features have been implemented on cars to make drivers more aware of their surroundings. For example, speeding alarms can be used to alert drivers that they are going above the designated speed limit. In another example, rear view cameras can enable drivers to view what is behind them when backing into a parking spot.

Cameras or other data capturing devices are limited by their detection capabilities, which can be reduce their effectiveness, such as when their views are blocked even partially. The problem exacerbates when a vehicle is surrounded by several other vehicles at the same time, limiting the driver's view to vehicles next to or in front of the driver. For example, when stopped at an intersection with cars on both left and right, a driver may have difficulty seeing (or viewing through a camera) whether a car is coming into the intersection at a high rate of speed and might possibly run a red light.

There is therefore a need for a device, system, and method, which provides to a vehicle occupant views that are blocked by other vehicles or objects.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for enhancing traffic safety through augmented reality and shared data. For example, cars are increasingly equipped with cameras in the front or on the sides (which can be helpful for exiting a parking garage). Data (including visual and audible) captured using these cameras (also referred to as view data in the present disclosure) can be used to determine whether a car is approaching from the sides or other directions; the view data can be further shared with nearby cars whose views might be blocked or otherwise unavailable directly from sensors of the nearby cars. The view data can be displayed to drivers in the nearby vehicles using augmented reality technologies, for example, by projecting the camera view (identified by the view data) onto the front windshield of a nearby vehicle, such that the driver in that vehicle may feel like she could see through cars that are blocking her view.

View data can include sounds captured by one or more vehicles that are not heard by a recipient or target driver/vehicle. For example, screaming, sirens, tires screeching, and other sounds that may be beneficial for the target driver/vehicle to hear can be relayed to the target driver/vehicle. The sounds can be captured from outside or within a vehicle. For example, when a vehicle camera includes a microphone, the camera can capture not only images or videos, but also sounds. Sounds that are audible to one driver may not be audible to another drive, e.g., due to the existence of sound barriers or distance. In some implementations, therefore, sound data can be relayed by one vehicle to another vehicle so that the driver of the other vehicle (who might not otherwise be able to hear the sound) may be alerted to the sound.

View data may also include in-vehicle views (e.g., movement of a driver within a car) that may not be available to the drivers of other vehicles. For example, a camera or sound detection device within a vehicle may capture braking, a movement of the driver to restrain a passenger by moving an arm of the driver across the body of the passenger, a sudden swerving or turning of the wheel, or other actions that may alert the target driver/vehicle of an upcoming incident. For example, after seeing that a police officer is standing in the middle of an intersection directing traffic, a driver may say to her passenger that "Hey. There may be an accident. Let's slow down" and make legs movements to apply car brakes. This in-vehicle conversation and movement may not be available (e.g., audible or visible) to the occupants of other vehicles whose views of the police officer are blocked. In some implementations, therefore, sound and movement data corresponding to the conversation and the leg movement (with appropriate user permissions) can be relayed to another vehicle so that the driver of the other vehicle may be alerted to the fact that a police office is standing in the middle of an intersection, directing traffic.

In an implementation involving driverless cars, the view data can be used to generate instructions for controlling a driverless car. For example, when another car is identified as speeding into an intersection against a stop light, a driverless car can be instructed to maintain the brakes and not enter the intersection until the speeding car has stopped or cleared the intersection.

If multiple cars are available to provide view data, then the extra data can be used to ensure one of the "provider" cars is not spoofing the data. Data could also be obtained from cameras equipped on street lights, where these street lights might have a digital certificate to aid in trusting the data as being authentic. These technologies can, for example, make driving safer at intersections when other cars might be running a light.

The systems and methods described in the present disclosure can provide a variety of technical advantages. First, view data captured by one vehicle can be used to benefit another vehicle, even when the view data is not directly available to the other vehicle, such as due to its view being blocked.

Second, in the implementations where vehicles are sharing data on a peer-to-peer (P2P) basis, sharing camera views between the vehicles may not require communicating with a remote server, the cost of which can be prohibitive (e.g., especially when cellular data is used).

Third, traffic data already being collected by traffic radars or street cameras can be used for not only monitoring traffic congestion, but also a new purpose of providing augmented views of potential traffic hazards to individual drivers.

Additional details of implementations are now described in relation to the Figures.

Figure 1:
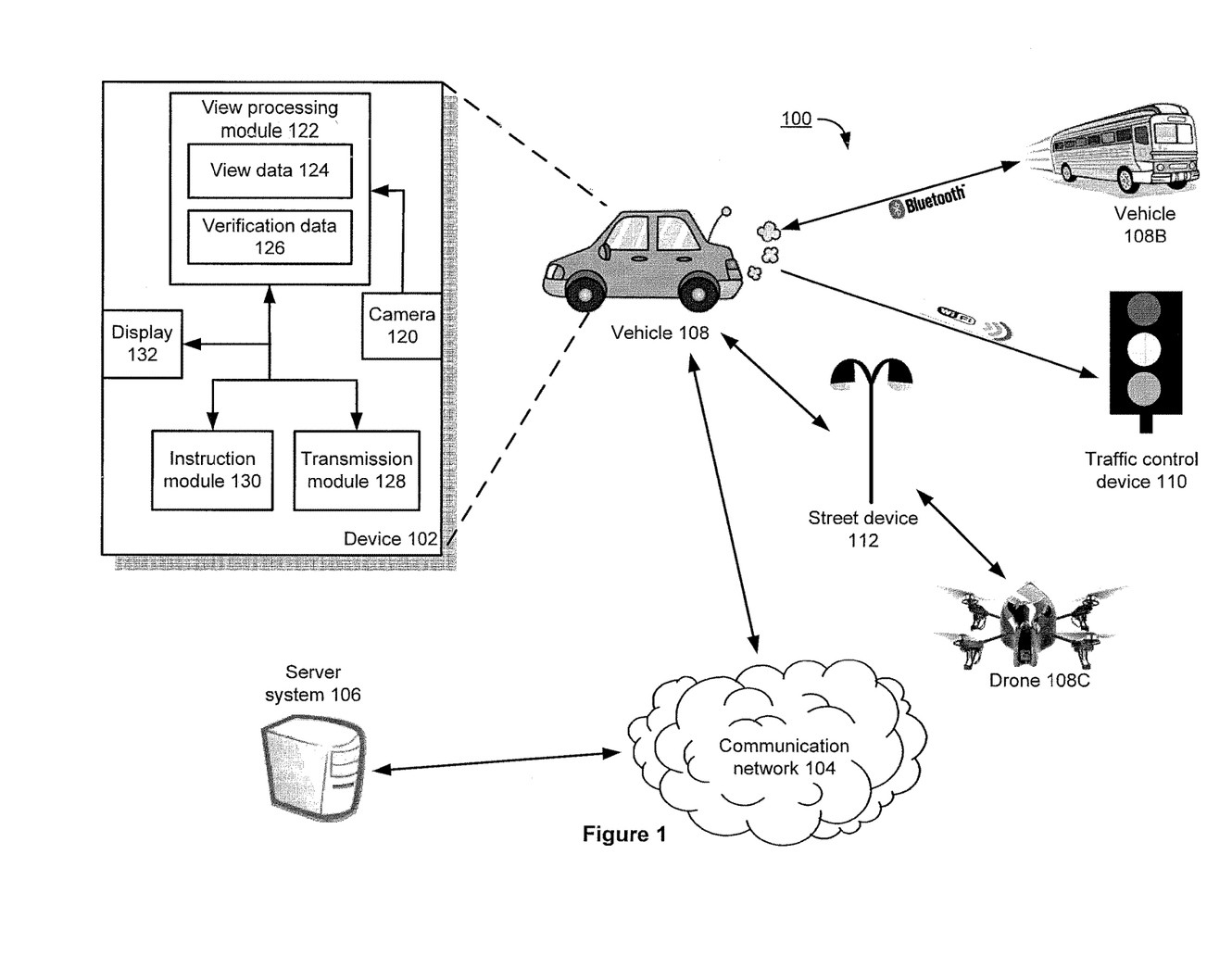
FIG. 1 is a schematic view illustrating an embodiment of a system for enhancing traffic safety through augmented reality and shared data.

FIG. 1 is a schematic view illustrating an embodiment of a system 100 for enhancing traffic safety through augmented reality and shared data. The system 100 may comprise or implement a plurality of servers and/or software components that operate to perform various technologies provided in the present disclosure.

As illustrated in FIG. 1, the system 100 may include a plurality of vehicles (e.g., 108, 108B, and 108C), a server system 106, a traffic control device 110, and a street device 112 in communication over a peer-to-peer network (e.g., a Wi-Fi network or a Bluetooth network), a communication network 104, or a combination thereof. In the present disclosure, a vehicle is a mobile machine that transports people or cargo. An example vehicle may be a wagon, a bicycle, a motor vehicle (e.g., a motorcycle, a car, a truck, or a bus), a railed vehicle (a train or a tram), a watercraft (a ship or a boat), an aircraft (e.g., a drone or an airplane), and a spacecraft. In one embodiment, each of the plurality of vehicles 108 is equipped (or communicated connected) with a device 102.

In one embodiment, the device 102 installed on the vehicle 108 collects view data (generally including image/visual and/or audio data) using a camera 120 (or any other imaging or video recording devices, including sound capturing devices) and shares the view data with other vehicles (e.g., the vehicle 108B and the drone 108C). The device 102 may also obtain view data from (1) another vehicle (e.g., the vehicle 108B and the drone 108C), (2) a traffic control device 110, or (3) a street device 112. The device 102 may (1) display a view corresponding to the view data (e.g., collected by the vehicle 108B or by the vehicle 108 itself) on the windshield of the vehicle 108 (or in the case of audio data, output through a speaker device of the vehicle 108) or (2) generate instructions to control the vehicle 108 (e.g., when the vehicle 108 is operating without a driver or in a semi-automatic mode, such as a cruise control mode).

In some embodiments, the device 102 may include one or more cameras 120, a view processing module 122, a transmission module 128, an instruction module 130, and a display 132.

In some embodiments, the device 102 is communicatively connected with one or more cameras 120 (e.g., a front camera, a side camera, and a rear camera) installed on the vehicle 108 or on the vehicle 108B. A camera may capture images or sound or record videos of objects within its view (where "view" is referred to herein to a distance, orientation, and/or location that enables the data capturing device to capture an image, sound, or other content). In some embodiments, the device 102 is communicatively connected with a camera installed on another vehicle e.g., through a directional Wi-Fi connection or a Bluetooth connection (such as a Bluetooth Low Energy (BLE) connection).

In some embodiments, the view processing module 122 verifies and analyzes view data (e.g., images or videos) captured by a camera. In some embodiments, the verification of view data includes determining whether the view data 124 is signed with a correct digital certificate. In some embodiments, the verification of view data includes comparing the view data (and the corresponding view) provided by a neighboring vehicle with those provided by a different source, e.g., another neighboring vehicle, a traffic control device 110, or a street device 112. These view verification technologies can reduce view spoofing, e.g., when a device is introducing false view data into the system 100.

In some embodiments, based on the view verification and analysis provided by the view processing module 122, a device 102 determines (1) whether to generate instructions to control a vehicle, (2) whether to display the corresponding views on a display 132, or (3) whether to share the view data with another vehicle.

For example, if view data collected by the traffic control device 110 identifies an object (e.g., another car) as moving at a high rate of speed into an intersection, despite that the traffic control device 110 is showing a stop signal to vehicles coming from that direction, the instruction module 130 may apply or maintain brakes on the vehicle 108 to prevent the vehicle 108 from entering the intersection.

In another example, if view data collected by the vehicle 108 identifies an object (e.g., a pedestrian) as slowly moving along a across walk, the instruction module may present an image of that object on the center-left portion of vehicle 108B's front windshield, so that the driver of the vehicle 108B is aware that a pedestrian is coming into her movement path.

In some embodiments, the device 102 is communicatively connected with one or more displays 132. In some embodiments, a display includes a portion of a vehicle's glass, e.g., the front windshield, the rear windshield, the rear view mirror, and the side mirrors. In other embodiments, a display includes a screen of a GPS device mounted on vehicle 108's dashboard, an in-car touchscreen, or a smart phone of a user present in the vehicle 108.

In some implementations, the communication network 104 interconnects one or more devices 102 with each other, and with the clustering system 106. In some implementations, the communication network 104 optionally includes the Internet, one or more local area networks (LANs), one or more wide area networks (WANs), other types of networks, or a combination of such networks.

Figure 2:
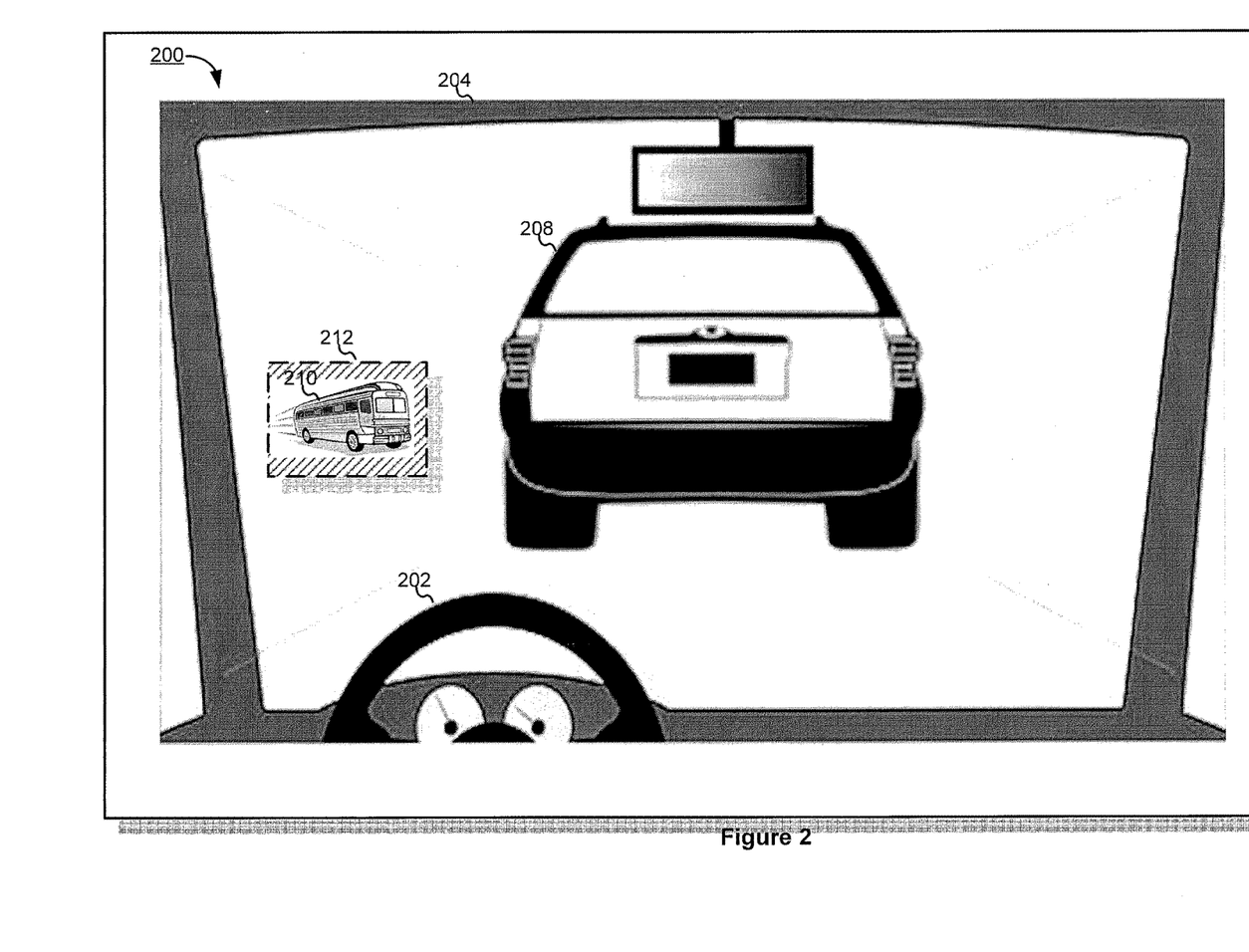
FIG. 2 is a schematic view illustrating an embodiment of a method for enhancing traffic safety through augmented reality and shared data.

FIG. 2 is a schematic view illustrating an embodiment of a method 200 for enhancing traffic safety through augmented reality and shared data. The device 102, for example, when programmed in accordance with the technologies described in the present disclosure, can perform the method 200.

The vehicle 202 is behind the vehicle 208; both the vehicles 202 and 208 may be moving (e.g., on a local street) or have stopped (e.g., at an intersection).

As shown in FIG. 2, a portion of the vehicle 202's front view is blocked by the vehicle 208 due to their relative positions of each other. Views of the cross traffic that are available to the vehicle 208 may therefore be unavailable to the vehicle 202 (or the driver operating thereof).

For example, a third vehicle 210 may be moving, at the cross direction, towards the vehicles 202 and 208. The view of the third vehicle 210's movement (e.g., from the viewpoint of the vehicle 202's driver) may be blocked by the vehicle 208 and thus not available to the vehicle 202 (or the vehicle 202's driver).

In this situation, it may therefore be technically advantageous to provide a view of the vehicle 210's movement to the vehicle 202. As shown in FIG. 2, an image 212 (e.g., an actual image of the vehicle 202 or an icon representing the vehicle 202) identifying the moment of the vehicle 210 is presented on the windshield of the vehicle 202. By these ways, the vehicle 202's driver can be made aware of the cross-movement of the vehicle 210, notwithstanding that such a direct view is blocked, and operate accordingly.

Figure 3:
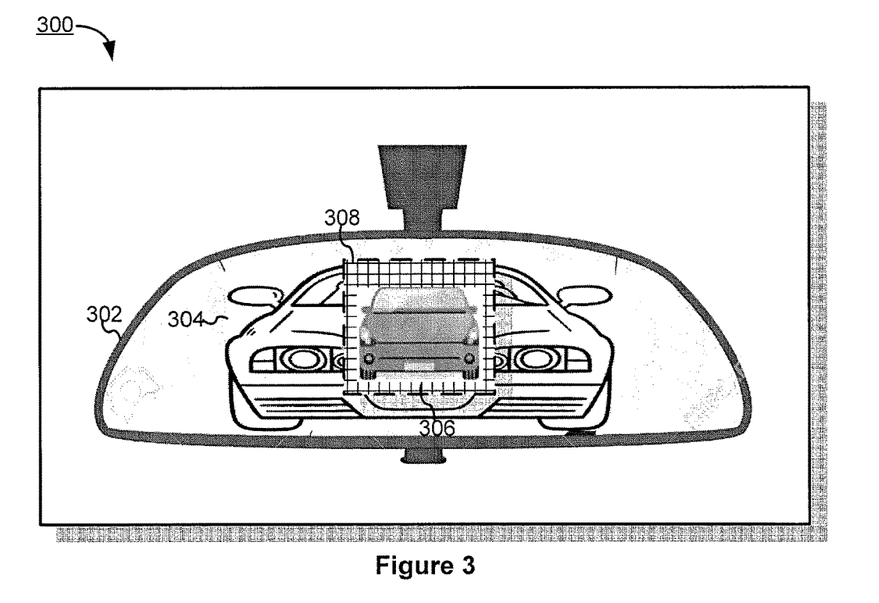
FIG. 3 is a schematic view illustrating an embodiment of a method for enhancing traffic safety through augmented reality and shared data.

FIG. 3 is a schematic view illustrating an embodiment of a method 300 for enhancing traffic safety through augmented reality and shared data. The device 102, for example, when programmed in accordance with the technologies described in the present disclosure, can perform the method 300.

As shown in FIG. 3, the vehicles 302 and 304 may have stopped or be moving below a predetermined speed (e.g., 10 miles per hour). The vehicle 302 is in front of the vehicle 304; as a result, a portion of vehicle 302's rear view is blocked by the vehicle 304.

Due to the blockage, views of the traffic coming from the behind of the vehicle 304 may be (while still available to the vehicle 304) at least partially unavailable to the vehicle 302. For example, if a third vehicle 306 is moving, from the behind, towards the vehicles 302 and 304. The view of the third vehicle 306's movements may be blocked by the vehicle 304 and thus not available to the vehicle 302.

In this situation, it may therefore be technically advantageous to provide at least a partial view of the vehicle 306's movement to the vehicle 302. As shown in FIG. 3, an image 308 indicative of not only the vehicle 306's presence but also its current location and movement direction or speed is displayed on the vehicle 302's rear view mirror. By these ways, the driver of the vehicle 302 can be made aware of the vehicle 306's movement from the behind direction and operate accordingly.

Figure 4:
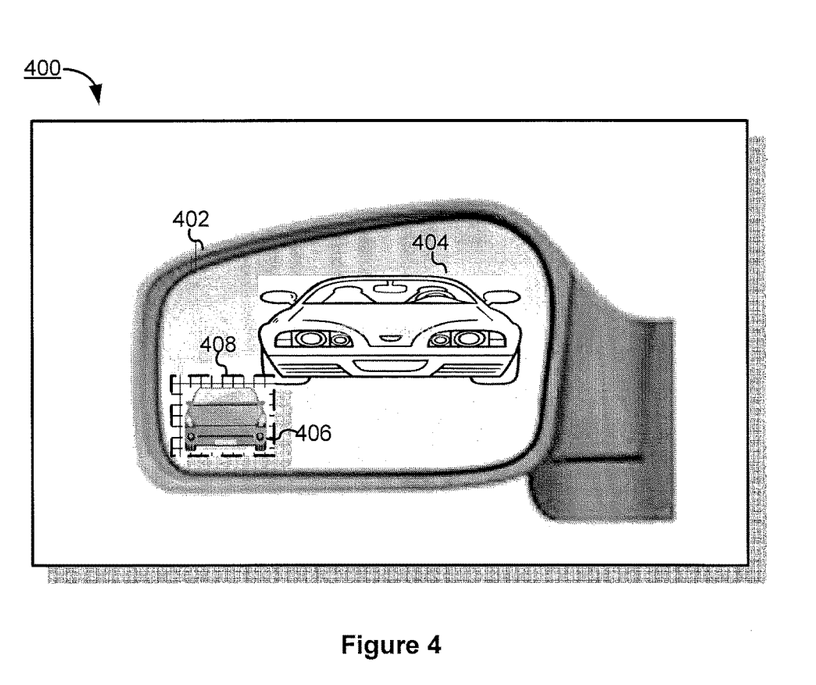
FIG. 4 is a schematic view illustrating an embodiment of a method for enhancing traffic safety through augmented reality and shared data.

FIG. 4 is a schematic view illustrating an embodiment of a method 400 for enhancing traffic safety through augmented reality and shared data. The device 102, for example, when programmed in accordance with the technologies described in the present disclosure, can perform the method 400.

As shown in FIG. 4, the vehicle 404 is to the left of the vehicle 402; as a result, vehicle 402's left view is partially blocked by the vehicle 404.

A third vehicle 406 may be moving, in the cross direction, from the left towards the vehicles 402 and 404. Due to the blockage caused by the vehicle 404, however, the view of the third vehicle 406's movement may be unavailable to the vehicle 402.

In this situation, it may therefore be technically advantageous to provide a view of the third vehicle 406's cross-direction movement to the vehicle 402. As shown in FIG. 4, an image 408 showing a movement moment of the vehicle 406 is displayed on the left view mirror of the vehicle 402. As a result, the driver of the vehicle 402 can be made aware of the cross-movement of the vehicle 406 and operate accordingly.

Using the augmented view technologies described in the present disclosure, a vehicle's blocked view can be supplemented with those available to and collected by other vehicles. One or more supplemental views can be presented on the same or different display components of the vehicle. For example, technologies described with reference to FIGS. 3-4 can be implemented on the same vehicle such that a supplemental rear view can be presented on the vehicle's rear view mirror and a supplemental left view can be presented on the vehicle's left side mirror. Note that, in some embodiments, a supplemental view is presented at an in-vehicle display location that corresponds to the direction from which a vehicle captured in a blocked view is coming from.

In the example shown in FIG. 3, because the vehicle 306 is coming from behind the vehicle 302, the supplemental view (of the vehicle 306) is displayed on the vehicle 302's rear (as opposed to left) view mirror. In the example shown in FIG. 4, because the vehicle 406 is coming from the left cross direction of the vehicle 402, the supplemental view (of the vehicle 406) is displayed on the vehicle 402's left (as opposed to the right or rear) view mirror.

Presenting a supplemental view at an in-vehicle location corresponding to the direction from which a vehicle in a blocked view is coming from can help a driver to more intuitively understand the movement (direction and speed) of the vehicle in the blocked view, reducing cognitive burdens on the driver to fast process the augmented views provided using technologies described in the present disclosure and enabling the driver to react faster than otherwise possible.

Figure 5:
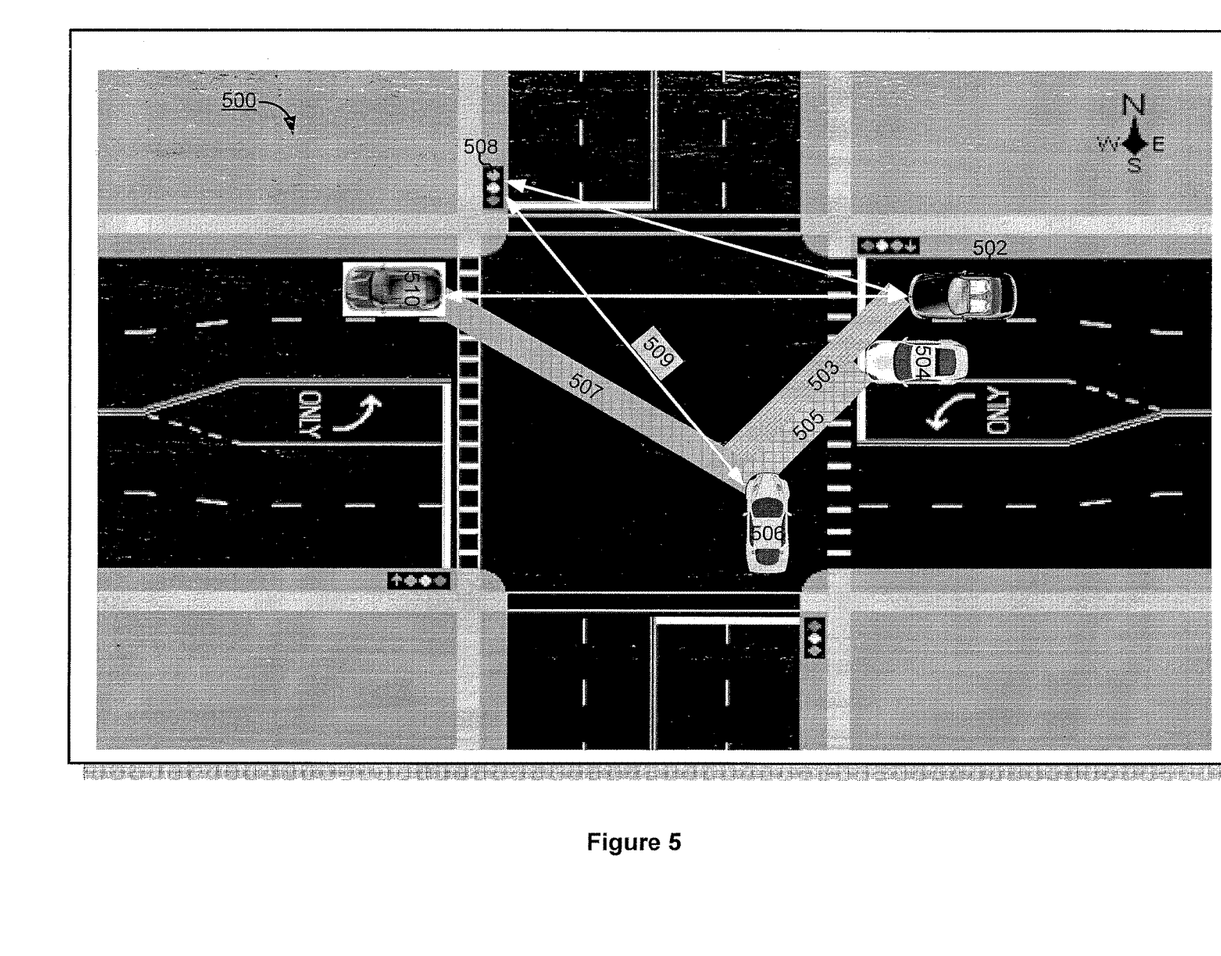
FIG. 5 is a schematic view illustrating an embodiment of a system for enhancing traffic safety through augmented reality and shared data.

FIG. 5 is a schematic view illustrating an embodiment of a system 500 for enhancing traffic safety through augmented reality and shared data. The system 500, which can be the system 100 shown in FIG. 1, may comprise or implement a plurality of servers and/or software components that operate to perform various technologies provided in the present disclosure.

As shown in FIG. 5, the vehicle 502 and the vehicle 504 have both stopped at the intersection. The vehicle 502's left view is partially blocked by the vehicle 504, because the vehicle 504 stopped closer to the intersection than the vehicle 502 did. A portion of the blocked view 503 is shown using the pattern filled with straight lines.

As a result of the blocked review 503, the vehicle 502 does not have a full view of the vehicle 506, which is entering the intersection northbound. Without knowing that the vehicle 506 is entering the intersection, if the vehicle 502 enters the intersection before the vehicle 506 clears the intersection, an accident may occur.

In contrast, the vehicle 504 has an unobstructed view 505 of the vehicle 506, having stopped closer to the intersection and clear of any view-obstructing objects. A portion of the view 505 is shown using the pattern filled with crossed lines. As shown in FIG. 5, the vehicle 506 is visible in the view 505. In some embodiments, having determined that its view of the intersection is obstructed, the vehicle 502 requests view data from vehicles near the intersection (e.g., the vehicle 504 and 510), so that the vehicle 502 can augment (e.g., supplement) its own view 503 with those of the nearby vehicles (e.g., the views 505 and 507). As shown in FIG. 5, a portion of the view 507 is illustrated using the pattern filled with tiled lines.

In some embodiments, the vehicle 502 requests view data from multiple sources (e.g., the vehicles 504, 506, and 510, as well as the traffic light 508) to obtain a more complete view of the intersection.

Various view provider authentication and view verification techniques may be implemented to ensure that an augmented view is accurate, which can prevent the driver of a vehicle from being adversely affected. For example, a spoofed or otherwise inaccurate view may be communicated to the driver of the vehicle, causing the vehicle to stop in a situation where there is no need to stop. While stopped, another person may then attempt to rob or otherwise harm the driver.

In some embodiments, view providers are authenticated before their views are accepted. One of the view provider authentication techniques includes a digital certificate based authentication. A digital certificate may be attached to view data that a view provider (e.g., a vehicle, a street device, and a traffic control device) shares with one or more view recipients. A view recipient (e.g., a vehicle with an obstructed view, a street device, and a traffic control device) may verify that a view provider is who it claims to be based on the digital certificate.

For example, the traffic light 508 may attach its own digital certificate to images of the intersection it shares with the vehicles 502, 504, 506, and 510; and the vehicle 502 may use the digital certificate to verify that view data claimed to have been provided by the traffic light 508 is indeed provided by the traffic light 508.

In some embodiments, view data are shared among multiple vehicles through a P2P communication network (as opposed to a client-server communication network). For example, view data collected by one or more side and front cameras of the vehicle 504 can be wirelessly (e.g., through a Bluetooth or Wi-Fi connection) transmitted to the vehicle 502 or any other vehicle within a predefined proximity to the vehicle 504 (e.g., 30 feet). Placing a proximity requirement on sharing view data can reduce potential driver confusion and protect user privacy, because nearby vehicles are more likely to have legitimate interests in obtaining augmented views of a same location (e.g., the same intersection). In a contrasting example, vehicles that are miles away from the intersection shown in the FIG. 5 may have a reduced interest or legitimacy in requesting or receiving view data relating to the intersection.

The proximity requirement may be enforced, using software packages or hardware structures. For example, the transmission module 128 of a device 102 may transmit view data using short-range communication protocols, e.g., the Bluetooth protocol, such that vehicles outside a predefined range (e.g., 20 feet away) from the device 102 cannot connect to and communicate with the device 102. For another example, the transmission module 128 may use circuit control components to adjust the strength of the signals it generates, so that only nearby (e.g., within 3 feet) vehicles can detect these signals.

In some embodiments, data verification technologies are implemented to reduce data spoofing. One of the data verification techniques involves a vehicle-to-vehicle (V2V) verification. One set of view data provided by one vehicle may, for example, be verified against another set of view data collected by another vehicle before it is transmitted or provided for presentation to a user.

To continue with the example shown in FIG. 5, before providing the view 505 to the vehicle 502, a device 102 installed on the vehicle 504 may verify the view 505 against the view 507. As shown in FIG. 5, the view 507 (a left rear view of the vehicle 510) also shows that the vehicle 506 is entering the intersection. Here, the views 505 and 507 may be deemed as verified views (which may have higher reliability ratings than an unverified view), because they corroborate each other by both showing that the vehicle 506 is entering the intersection. A verified view may be transmitted from a "provider" vehicle to a "recipient" vehicle through a P2P network and presented to a user without further authentication or verification.

Another data verification technique involves a vehicle-to-street device verification. One set of view data provided by one vehicle may, for example, be verified against another set of view data provided by a street device equipped with an imaging device (e.g., a video camera) or an object detection device (e.g., a sonar device, a radar device, or a laser device).

For example, before providing the view 505 to the vehicle 502, the system 500 may verify the view 505 against the radar result 509 (which are also considered view data in the present disclosure) provided the traffic light 508. The traffic light 508 may be equipped with a radar gun that can detect the existence and movements (e.g., direction, angle, and speed) of an object within the intersection. As shown in FIG. 5, the radar result 509 indicates that an object is moving northbound into the intersection at a high rate of speed. Because both the view 505 and the radar result 509 indicate that an object is entering the intersection northbound with a relatively high speed, the view 505 may be deemed a verified view and the radar result 509 a verified result.

In some implementation, after verifying view data, the system 500 provides the verified view data to a vehicle whose corresponding view has been (at least partially) blocked. For example, the system 500 may transmit view data descriptive of the view 505 to the vehicle 502, so that the vehicle 502 can have a combination of the view 503 and the view 505, augmenting its own view of the intersection.

Figure 6:
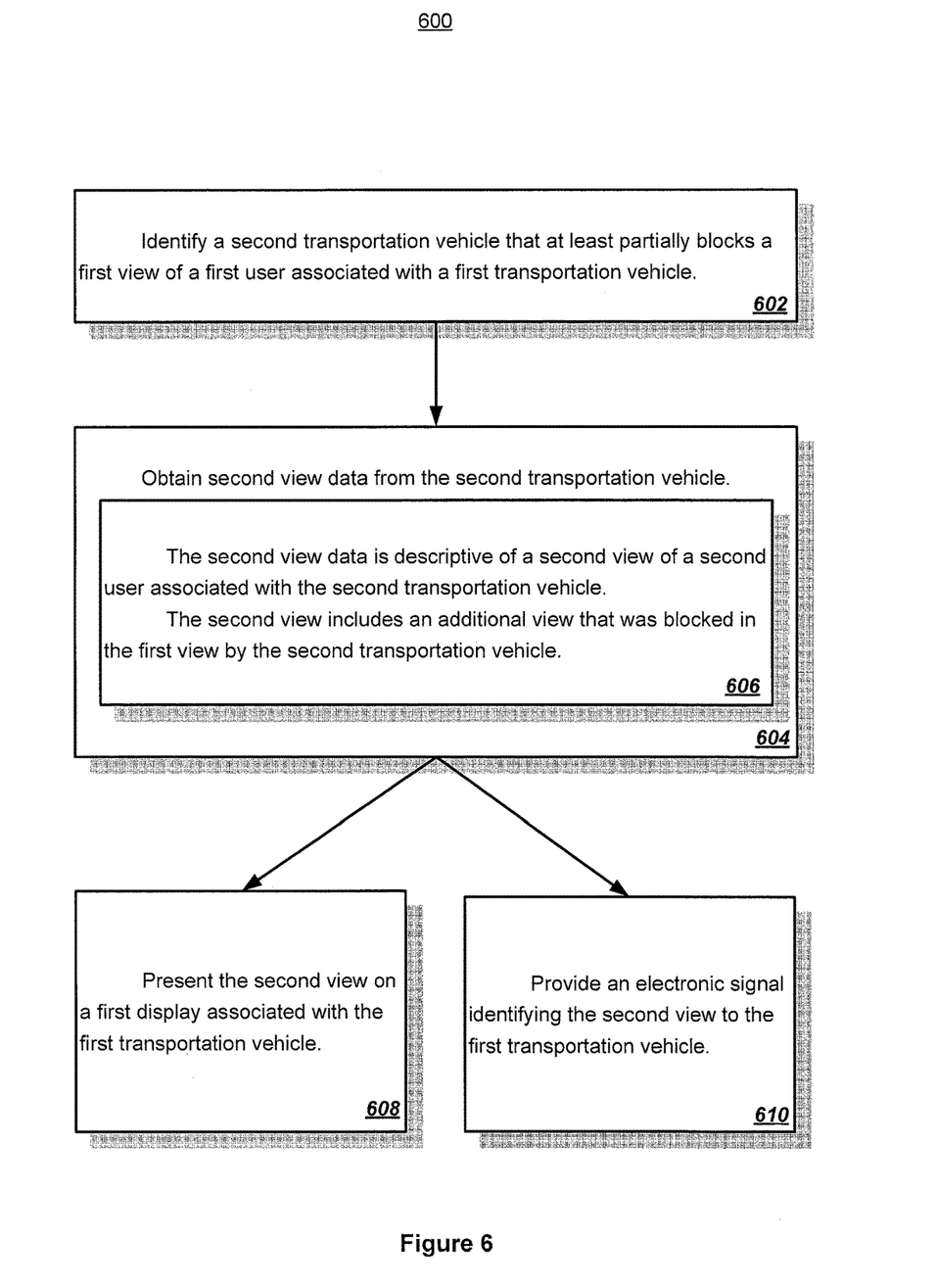
FIG. 6 is a flow chart illustrating an embodiment of a method for enhancing traffic safety through augmented reality and shared data.

FIG. 6 is a flow chart illustrating an embodiment of a method for enhancing traffic safety through augmented reality and shared data. The device 102, for example, when programmed in accordance with the technologies described in the present disclosure, can perform the method 600.

In some embodiments, the method 600 includes identifying (602) a second transportation vehicle that at least partially blocks a first view of a first user associated with a first transportation vehicle.

In some embodiments, a vehicle may, based on camera input, determine that the view of a user (e.g., a driver or a passenger) of the vehicle is blocked by a foreign object (e.g., another vehicle or a street divider).

For example, if more than 70% of a camera view includes the same color (e.g., black, burgundy, yellow, red, or any other known car paint color), the device 102 may determine that another vehicle has blocked the view of the camera. In another example, if an object shown in a camera view has the shape, size, or thermal characteristics (e.g., heat reflection) corresponding to a known vehicle part (e.g., a tire, a wheel rim, a front hood, or a door handle) and the object has occupied more than 50% of the camera view, the device 102 may determine that another vehicle has blocked the camera's view.

In some embodiments, based on a determination that a camera's view has been blocked by another vehicle, the device 102 may determine that the vehicle driver's view is also blocked by the other vehicle. This determination can be made, in some embodiments, because the viewing angle and range of a vehicle camera may substantially overlap with those of the vehicle driver. For example, a camera installed on a sedan's front bumper may cover substantially the same viewing angle and range of the sedan driver; a camera install at the center of the rear windshield of a SUV may cover substantially the same (if not more) viewing angle and range of the SUV driver.

In some embodiments, the method 600 includes obtaining (604) second view data from the second transportation vehicle. For example, when a vehicle's view is determined as blocked by another vehicle, the device 102 installed on the vehicle may communicate with the other vehicle (blocking the view) and obtain camera data from the other vehicle. For example, as shown in FIG. 5, when the left front view (e.g., the view 503) of the vehicle 502 is partially blocked by the vehicle 504, the vehicle 502 requests view data (showing the view 505) from the vehicle 504.

In some embodiments, the second view data is descriptive (606) of a second view of a second user associated with the second transportation vehicle and the second view includes an additional view that was blocked in the first view by the second transportation vehicle. For example, as shown in FIG. 5, the view 505 is available to the driver of the vehicle 504, but not available to the driver of the vehicle 502. The view 505 therefore includes an additional view that was blocked in the view 503.

In some embodiments, the method 600 further includes presenting (608) the second view on a first display associated with the first transportation vehicle. For example, the view 505 may be presented on the left side mirror of the vehicle 502 or the left side of the front windshield of the vehicle 502.

As explained with reference to at least FIGS. 1 and 5, a view data verification feature may be provided. For example, in some embodiments, the method 600 includes obtaining verification data from a street device, wherein the verification data is descriptive of the second view; verifying the second view in accordance with the verification data; and in response to the verifying, presenting the second view on the first display associated with the first transportation vehicle.

For example, the view 505 may be verified against the view (or radar detection result) 509 of the traffic light 508. Image recognition or object detection techniques may be used for view verification purpose. For example, one or more image recognition techniques may be used to recognize one of the objects displayed in an image representing the view 505 as a sedan (the vehicle 505). An image representing the view 507 may be similarly recognized to determine whether it includes a car (the vehicle 505). In some implementation, if both of the images are recognized as including a similarly-shaped object (the vehicle 505), the device may determine that the views 505 and 507 have been verified (against each other) as accurate.

For another example, in combination with using recognizing objects displayed in an image, the device 102 may apply a movement detection technique (e.g., using a radar- or laser-based object detection device) to recognize whether an object is moving at above a threshold speed (e.g., the designated speed limit). If an image is recognized as including a sedan travelling northbound and a radar result also shows that an object is moving northbound at approximately 35 miles per hours, then the device 102 may determine that the view 505 has been verified (against the radar result) as accurate.

In some embodiments, a street device can be a traffic control device (e.g., a traffic light, a radar- or laser-based speed detector) or a lighting device (e.g., a street light equipped with a camera).

In some embodiments, an augmented view is automatically provided to a vehicle whose view is blocked, when another nearby vehicle is not following traffic rules, creating a safety concern for one or more occupants of the vehicle.

In some embodiments, therefore, the street device is a traffic control device, and the method 600 may further include: determining a traffic control signal shown by the traffic control device; determining that a second object present in the second view is not following the traffic control signal; and in response to the determining that the second object present in the second view is not following the traffic control signal, presenting the second view on the first display associated with the first transportation vehicle.

For example, at the intersection shown in FIG. 5, a traffic light equipped with a camera and a speed radar may determine that the current signal facing the northbound traffic is a stop signal (e.g., a red light), and that an object (e.g., the vehicle 506) is moving northbound, towards the intersection, at 60 miles per hour without any detectable speed reduction or de-acceleration. Based on these determinations, the device 102 installed on the vehicle 502 may determine that the object is another vehicle about to run the stop signal, which creates a traffic hazard that the driver of the vehicle 502 may need to be alerted to. The device 102 may obtain an image of the speeding object (the vehicle 506) and present the image on the center of the vehicle 502's front windshield with a red colored exclamation mark, to notify the vehicle 502's driver of the potential traffic hazard.

Similar to the data verification technologies described above, in some embodiments, rating technologies may be used to indicate and determine whether a view is reliable before providing the view to another vehicle or presenting the view to a vehicle user. In other words, in some implementations, unreliable views are not provided to a vehicle user, even though it may augment the user's current (blocked) view.

The method 600 may therefore further include, obtaining rating data associated with the second view data; and determining whether to present the second view on the first display in accordance with the rating data.

For example, based on factors such as the reliability of past view data provisions, credibility (e.g., credit trustworthiness) of a user associated with the vehicle, view data collected by a vehicle may be rated. For rating purpose, a user associated with a vehicle may include, for example, the registered owner of the vehicle, a user whose smartphone is connected through a Bluetooth connection to the vehicle's entertainment system, a user whose GPS movements coincide with those of the vehicle, and a user who is making a phone call through the vehicle's cellular call system. Also, in some implementations, if a user has spoofed the system once, then the system may consider view data provided by the user's vehicle as unreliable, for a predefined time period (e.g., 2 years). In some embodiments, the server system 108 maintains a rating database and updates reliability ratings of the users or vehicles identified in the rating database.

In some embodiments, an augmented view is automatically provided when the system determines, with a predetermined level of certainty, that a traffic hazard exists. The method 600 therefore may further include determining that a travel speed associated with a second object present in the second view is more than a predetermined speed; and in response to the determining, presenting the second view on the first display associated with the first transportation vehicle.

For example, a blocked view of one vehicle is augmented with an unblocked view obtained from another vehicle, when the unblocked view includes a car either travelling above a predefined speed (e.g., 75 miles per hour) or above the designated speed limit, or moving in violation of a traffic signal, or otherwise moving in violation of a traffic rule (e.g., no more than 25 miles per hour in a school zone).

In some embodiments, an augmented view is provided to a vehicle driver, when the vehicle is moving at a relatively low speed or has stopped, e.g., to reduce potential driver distraction or confusion. The method 600 may therefore performed without user input, in response to determining that the first transportation vehicle is moving below a predetermined speed.

For example, a device 102 can obtain a vehicle's speed based on cellular tower triangulation or GPS technologies or based on a speedometer reading; an augmented view is provided when the vehicle is travelling at less than 10 miles per hours or has stopped at an intersection or near a traffic control device (e.g., a stop sign, a stop line, or a cross walk).

In some embodiments, the presence of a traffic control device can also be detected using image or object recognition techniques. For example, OCR techniques can be applied to an image captured by a vehicle' front right camera to recognize whether that the image include a sign that has the word "STOP," which suggests that the vehicle is near a stop sign. Similarly, image analysis techniques (e.g., color or pixel analysis) can be applied to an image captured by a vehicle' front center camera to recognize whether the image includes a white color straight line (indicative of a stop line) or a white-colored pattern that resembles a crosswalk, which indicates that the vehicle has stopped behind a crosswalk.

In some embodiments, augmented reality views are provided to a vehicle driver automatically, upon determining that the driver may have a portion of her view blocked, e.g., due to the presence of another vehicle or any other objects (e.g., a traffic barrier) or conditions (e.g., a blind corner).

The method 600 may therefore be performed without user input, in response to determining that the second transportation vehicle is blocking the first view. In other words, a vehicle user does not need to manually activate a device 102 to obtain an augmented view; the augmented view (when available) is presented, e.g., on the vehicle front windshield, when the device 102 detects that one of its camera view has been blocked. These technologies are technically advantageous, as a vehicle going into a curve may enter blind spots shortly and automatically providing an augmented view on these blind spots in this situation may help the driver reduce traffic accidents.

In some embodiments, view data is transmitted between vehicles using a peer-to-peer (P2P) communication channel, such as a Bluetooth connection or a directional Wi-Fi connection. Besides the user privacy reasons explained above with reference to FIG. 5, a P2P communication is also technically advantageous, because it reduces the need to rely on communications between and through a server. In some embodiments, to reduce power consumption, for example, a Bluetooth connection is activated upon request (of a vehicle requesting an augmented view). The signal direction of a directional Wi-Fi router may also be selected and adjusted based on the relative positions of the vehicles requesting and providing view data.

Augmented view technologies described in the present disclosure can also be applied to driverless vehicles. In some embodiments, instead of presenting an augmented view on a display device, the device 102 may generate (610) a control signal to control the operation of a driverless car in accordance with an augmented view. For example, if an augmented view includes a speeding vehicle coming from a cross direction of a driverless vehicle waiting to enter an intersection, the device 102 may generate a brake signal to apply and maintain the brakes on the driverless vehicle and to allow the driverless vehicle to enter the intersection after the speeding vehicle has either stopped or cleared the intersection.

In some embodiments that involve driverless cars, therefore a device 102 may include a non-transitory memory; and one or more hardware processors coupled to the non-transitory memory and configured to execute instructions from the non-transitory memory to cause the system to perform operations comprising: identifying a second transportation vehicle that at least partially blocks a first view of a first user associated with a first transportation vehicle; and obtaining second view data from the second transportation vehicle. The second view data is descriptive of a second view of a second user associated with the second transportation vehicle, and the second view includes an additional view that was blocked in the first view by the second transportation vehicle. In some implementations, the operations further include providing an electronic signal identifying the second view to the first transportation vehicle.

Figure 7:
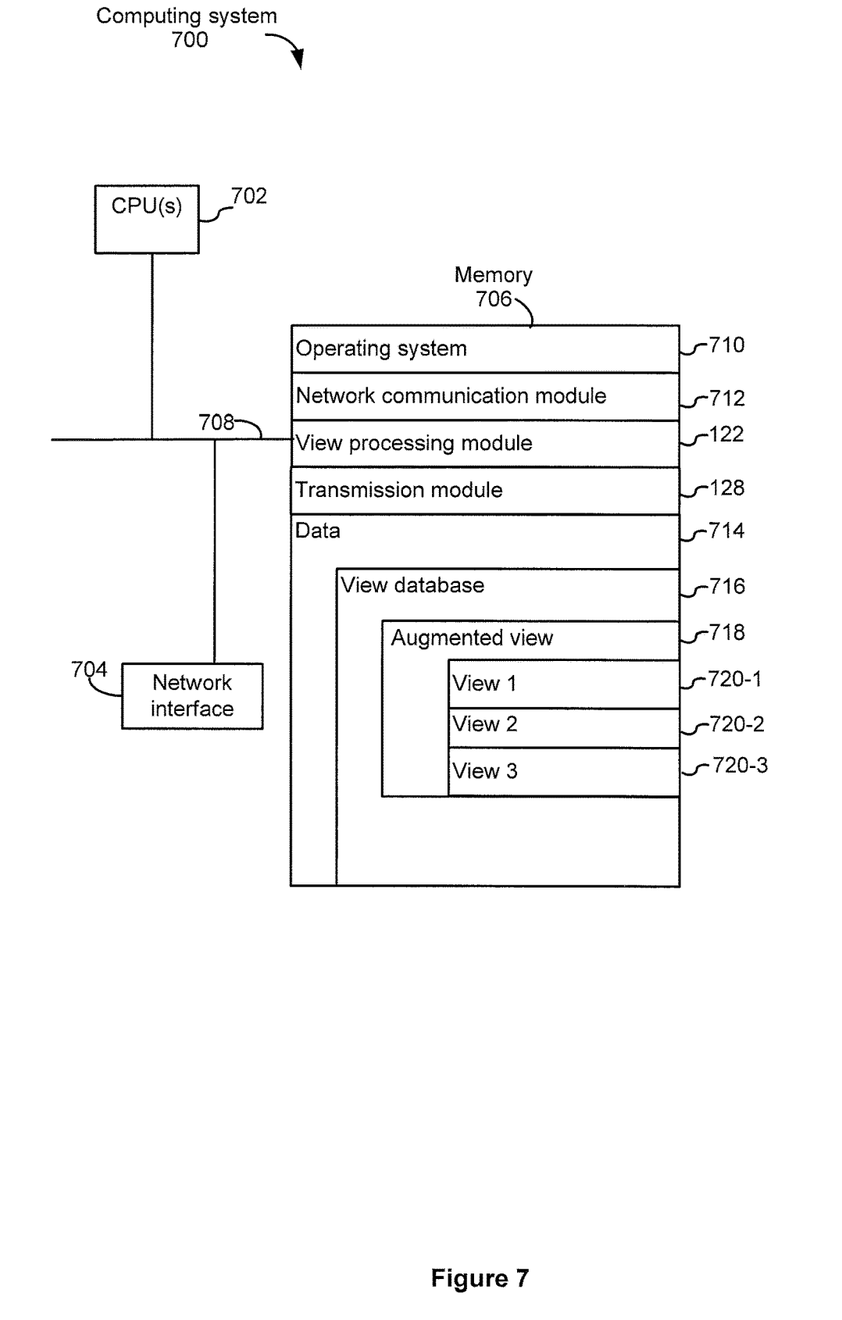
FIG. 7 is a schematic view illustrating an embodiment of a computing system.

FIG. 7 is a schematic view illustrating an embodiment of a computing system 700, which can be the server system 106 shown in FIG. 1. The system 700 in some implementations includes one or more processing units CPU(s) 702 (also referred to as hardware processors), one or more network interfaces 704, a memory 706, and one or more communication buses 708 for interconnecting these components. The communication buses 708 optionally include circuitry (sometimes called a chipset) that interconnects and controls communications between system components. The memory 706 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706, or alternatively the non-volatile memory device(s) within the memory 706, comprises a non-transitory computer readable storage medium. In some implementations, the memory 706 or alternatively the non-transitory computer readable storage medium stores the following programs, modules and data structures, or a subset thereof:

- an operating system 710, which includes procedures for handling various basic system services and for performing hardware dependent tasks;
- a network communication module (or instructions) 712 for connecting the system 700 with other devices (e.g., different device 102 installed on different vehicles 108) via one or more network interfaces 704;
- optionally a view processing module 122 for analyzing and verifying view data (e.g., images, videos, or radar results) collected by a vehicle or a street device;
- optionally a transmission module 128 for wirelessly transmitting (e.g., verified) view data from one vehicle to another vehicle;
- data 714 stored on the system 700, which may include:
  - a view database 716 for storing one or more augmented views 718, which is generated in accordance with one or more individual views (e.g., 720-1, 720-2, and 720-3).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 706 optionally stores a subset of the modules and data structures identified above. Furthermore, the memory 706 may store additional modules and data structures not described above.

Figure 8:
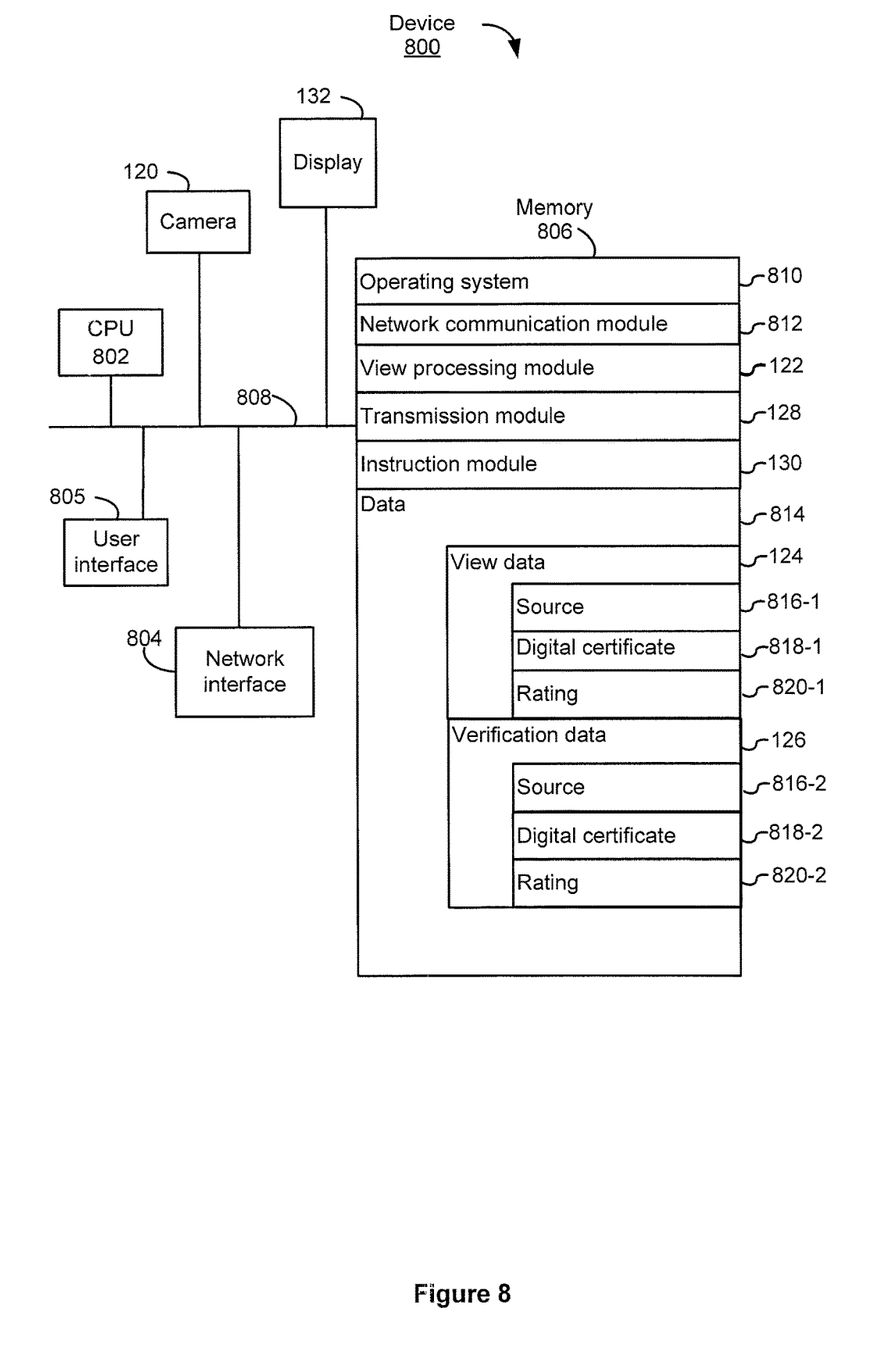
FIG. 8 is a schematic view illustrating an embodiment of a user device.

FIG. 8 is a schematic view illustrating an embodiment of a device 800, which can be the device 102 shown in FIG. 1. The device 800 in some implementations includes one or more processing units CPU(s) 802 (also referred to as hardware processors), one or more network interfaces 804, a user interface 805, a memory 808, and one or more communication buses 808 for interconnecting these components. The communication buses 808 optionally include circuitry (sometimes called a chipset) that interconnects and controls communications between system components. The memory 808 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 808 optionally includes one or more storage devices remotely located from the CPU(s) 802. The memory 808, or alternatively the non-volatile memory device(s) within the memory 808, comprises a non-transitory computer readable storage medium. In some implementations, the memory 808 or alternatively the non-transitory computer readable storage medium stores the following programs, modules and data structures, or a subset thereof:

- an operating system 810, which includes procedures for handling various basic system services and for performing hardware dependent tasks;
- a network communication module (or instructions) 812 for connecting the device 800 with other devices (e.g., similar devices in the vehicles 108B and 108C, and with the server system 106) via one or more network interfaces 804 (wired or wireless) or via the communication network 104 (FIG. 1);
- a view processing module 122 for analyzing and verifying view data (e.g., images, videos, or radar detection results) collected by a vehicle or a street device;
- a transmission module 128 for wirelessly transmitting (e.g., verified) view data from one vehicle to another vehicle or to the server system 106;
- an instruction module 130 for presenting an augmented view at an in-vehicle display location and for generating control instructions in accordance with view data to control the operation of a vehicle (e.g., a driverless car);
- data 814 stored on the device 800, which may include:
  - view data 124 that is descriptive of a view, which includes:
    - a source 816-1 from which the view data 124 is obtained;
    - a digital certificate 818-1 identifying the source 816-1 from which the view data 124 is collected; and
    - a rating 820-1 indicative of the reliability of the view data 124; and
  - verification data 126 that is descriptive of another view that overlaps at least a portion of the view described by the view data 124, which includes:
    - a source 816-2 from which the verification data 126 is obtained;
    - a digital certificate 818-2 identifying the source 816-2 from which the verification data 126 is collected; and
    - a rating 820-2 indicative of the reliability of the verification data 126.

The device 800 may further include a location determination component (e.g., a Global Positioning System (GPS) device and a cell tower triangulation device) for providing location information of the device 800. In some embodiments, the location of the device 800 is used to determine the location (e.g., which intersection, street, or highway) of the vehicle on which the device 800 is installed.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 808 optionally stores a subset of the modules and data structures identified above. Furthermore, the memory 808 may store additional modules and data structures not described above.

Although FIGS. 7 and 8 show a "computing system 700" and a "device 800," respectively, FIGS. 7 and 8 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device, comprising:
a non-transitory memory; and
one or more hardware processors coupled to the non-transitory memory and configured to read instructions from the non-transitory memory to cause the device to perform operations comprising:
determining, based on a first view associated with a first transportation vehicle, that a second transportation vehicle at least partially blocks the first view associated with the first transportation vehicle;
obtaining second view data from a first set of sensors of a first sensor type associated with the second transportation vehicle, wherein the second view data corresponds to a second view associated with the second transportation vehicle, and wherein the second view includes an additional view that was blocked in the first view by the second transportation vehicle;
determining, from the second view data, that an object is approaching the first transportation vehicle;
in response to determining that the object is approaching the first transportation vehicle from the second view data and before presenting the second view data in the first transportation vehicle, identifying an external device that provides a third view that includes at least a portion of the additional view based on a location of the external device, wherein the external device is external to the first transportation vehicle and the second transportation vehicle;
obtaining third view data corresponding to the third view from a second set of sensors of the external device, wherein the second set of sensors are of a second sensor type different from the first sensor type;
validating the second view data by identifying data within the third view data indicating the object is approaching the first transportation vehicle; and
in response to validating the second view data, presenting the second view data on a first display associated with the first transportation vehicle.

2. The device of claim 1, wherein the external device includes one of: a traffic control device or a lighting device.

3. The device of claim 2, wherein the external device is a traffic control device, and wherein the operations further comprise:
determining a traffic control signal shown by the traffic control device; and
determining that the object present in the second view is violating the traffic control signal, wherein
the second view data is presented on the first display associated with the first transportation vehicle in response to the determining that the object present in the second view is violating the traffic control signal.

4. The device of claim 1, wherein the operations further comprise:
obtaining rating data associated with the second view data; and
determining whether to present the second view data on the first display in accordance with the rating data.

5. The device of claim 1, wherein the operations further comprise:

determining, based on the third view data, a travel speed associated with the object present in the second view is more than a predetermined speed, wherein
the second view data is presented on the first display associated with the first transportation vehicle in response to the determining that the travel speed associated with the object is more than the predetermined speed.

6. The device of claim 1, wherein the operations are performed without any user input, in response to determining that the first transportation vehicle is moving below a predetermined speed.

7. The device of claim 1, wherein the operations are performed without any user input, in response to determining that the second transportation vehicle is at least partially blocking the first view.

8. The device of claim 1, wherein the second view data is obtained from the second transportation vehicle through a directional Wi-Fi or Bluetooth communication channel between the first transportation vehicle and the second transportation vehicle.

9. The device of claim 1, wherein the second view data includes image data captured by a camera installed on the second transportation vehicle, and wherein the third view data comprises data obtained from a radar sensor.

10. The device of claim 1, wherein determining that the object is approaching the first transportation vehicle from the second view data includes:
obtaining an image from the second view data; and
applying an object recognition technique to the obtained image included in the second view data to determine that the obtained image includes the object.

11. The device of claim 1, wherein validating the second view data includes:
obtaining sound data from the third view data; and
applying a sound analysis technique to the obtained sound data to verify that vehicle sound is present in the obtained sound data.

12. The device of claim 1, wherein the third view data includes one of: sound data, image data, or radar data.

13. The device of claim 1, wherein the operations further comprise in response to validating the second view data, automatically adjusting a parameter of the first transportation vehicle.

14. The device of claim 13, wherein adjusting the parameter comprises applying brakes on the first transportation vehicle.

15. The device of claim 1, wherein the operations further comprise:
analyzing the second view data to determine a location of the object with respect to the first transportation vehicle; and
determining the first display from a plurality of displays associated with the first transportation vehicle for presenting the second view data based on the determined location of the object.

16. A method, comprising:
determining, by one or more hardware processors based on a first view associated with a first transportation vehicle, that a second transportation vehicle at least partially blocks the first view associated with the first transportation vehicle;
obtaining, by the one or more hardware processors, second view data from a first set of sensors of a first sensor type associated with the second transportation vehicle, wherein the second view data is descriptive of a second view associated with the second transportation vehicle, and wherein the second view includes an additional view that was blocked in the first view by the second transportation vehicle;

determining, by the one or more hardware processors from the second view data, that an object is approaching the first transportation vehicle;

in response to determining that the object is approaching the first transportation vehicle from the second view data and before presenting the second view data in the first transportation vehicle, identifying, by the one or more hardware processors, an external device that provides a third view that includes at least a portion of the additional view based on a location of the external device, wherein the external device is external to the first transportation vehicle and the second transportation vehicle;

obtaining, by the one or more hardware processors, third view data corresponding to the third view from a second set of sensors of the external device, wherein the second set of sensors is of a second sensor type different from the first sensor type;

validating, by the one or more hardware processors, the second view data by identifying data within the third view data indicating the object is approaching the first transportation vehicle; and in response to validating the second view data, providing, by the one or more hardware processors, an electronic signal identifying the second view to the first transportation vehicle.

17. The method of claim 16, wherein the first transportation vehicle is a driver-less vehicle.

18. The method of claim 16 wherein the external device includes one of: a traffic control device or a lighting device.

19. The method of claim 16, further comprising in response to validating the second view data, automatically adjusting a parameter of the first transportation vehicle.

20. The method of claim 19, wherein adjusting the parameter comprises applying brakes on the first transportation vehicle.

* * * * *